March 10, 1970  R. L. GOODPASTER  3,499,518
CONVEYING MEANS AND METHOD
Filed Aug. 17, 1964  4 Sheets-Sheet 1
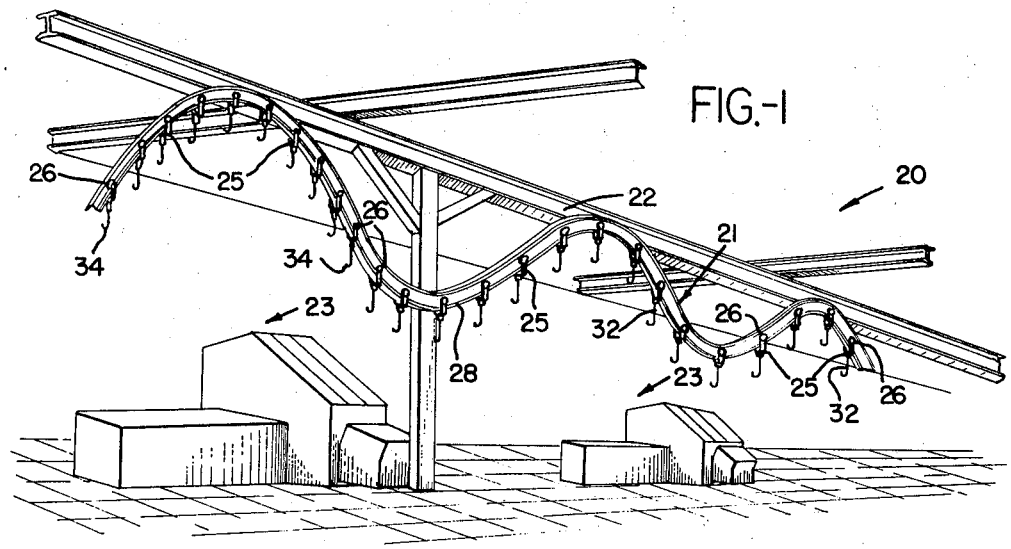
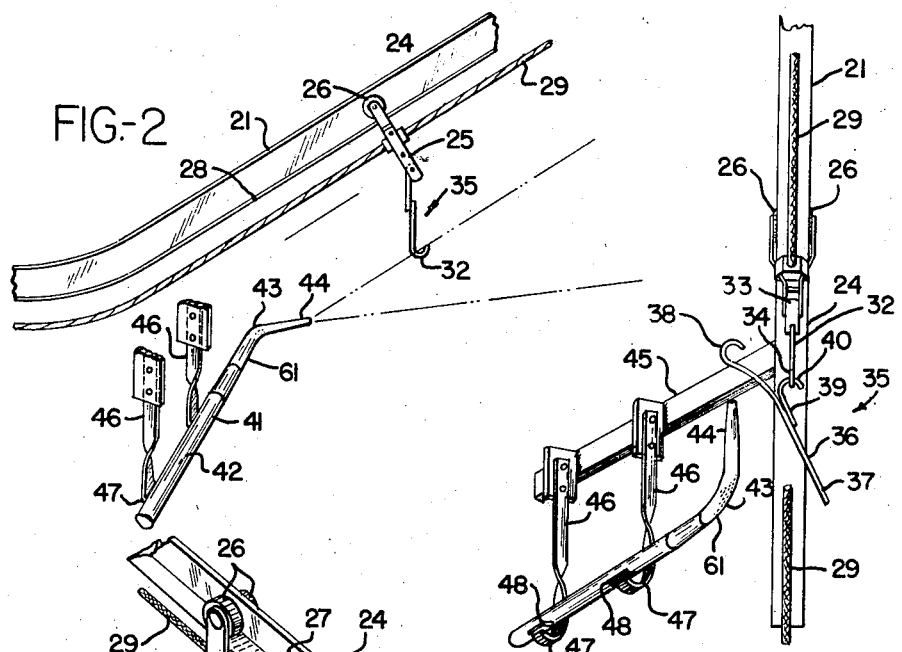
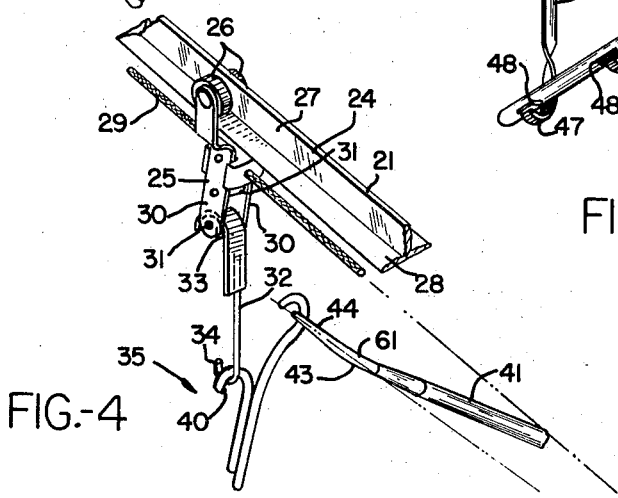
INVENTOR.
ROBERT L. GOODPASTER
BY Kinney & Schenk
ATTORNEYS

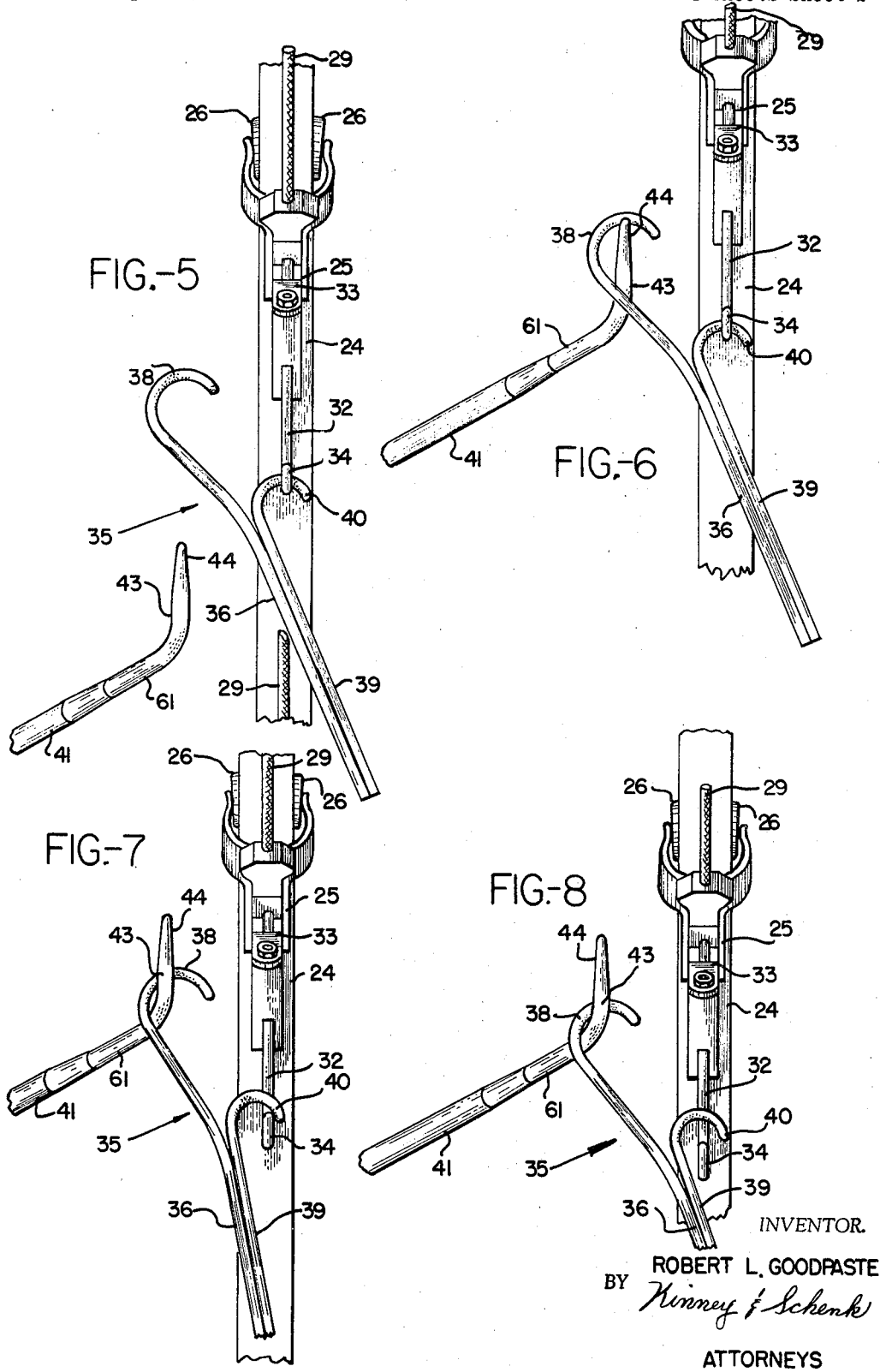

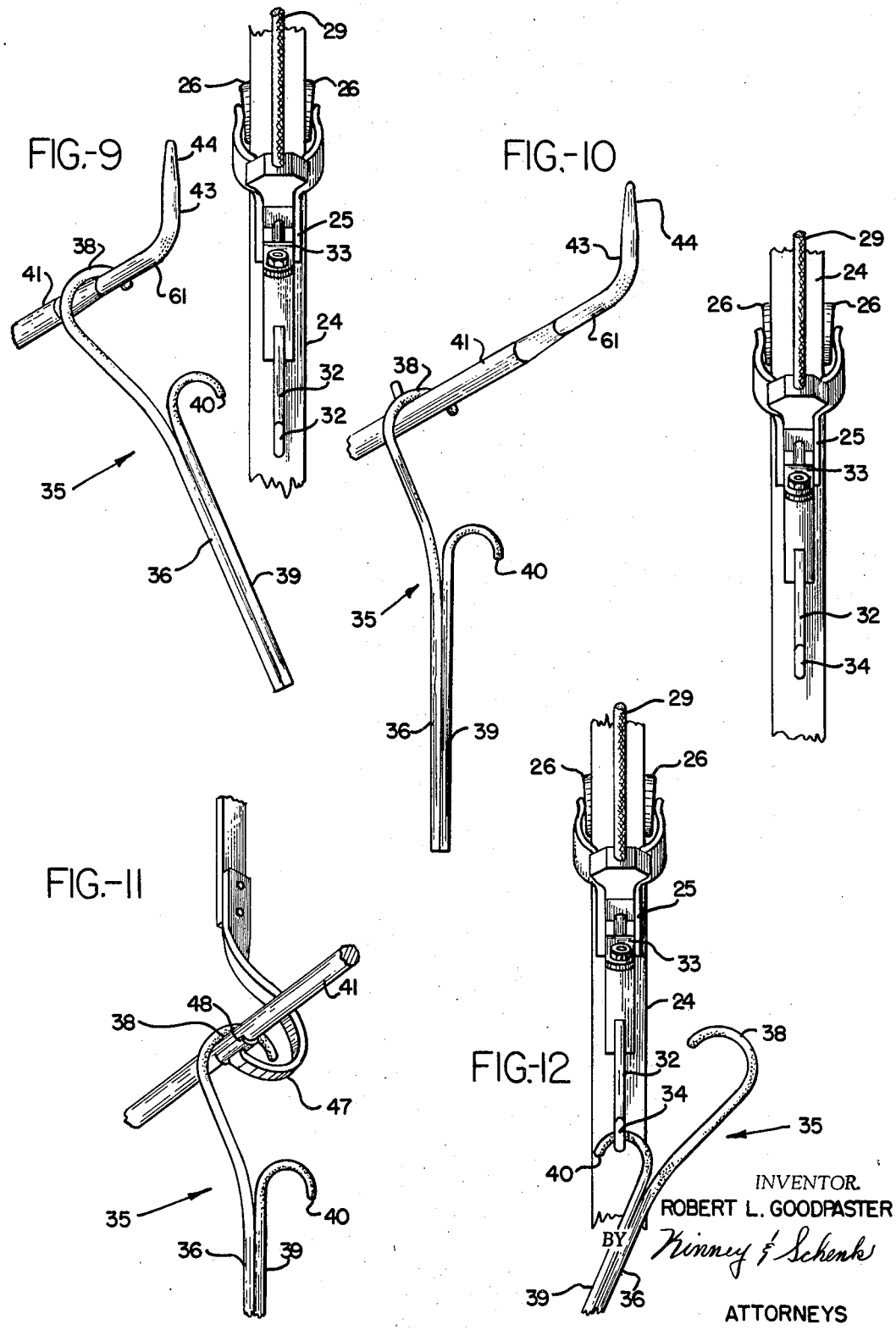

March 10, 1970  R. L. GOODPASTER  3,499,518
CONVEYING MEANS AND METHOD
Filed Aug. 17, 1964  4 Sheets-Sheet 4

INVENTOR.
ROBERT L. GOODPASTER
BY Kinney & Schenk
ATTORNEYS

United States Patent Office 3,499,518
Patented Mar. 10, 1970

3,499,518
CONVEYING MEANS AND METHOD
Robert L. Goodpaster, Cincinnati, Ohio, assignor to
Natmar, Inc.
Filed Aug. 17, 1964, Ser. No. 390,095
Int. Cl. B65g 47/00, 43/00, 17/20
U.S. Cl. 198—28                                    5 Claims

ABSTRACT OF THE DISCLOSURE

A conveyor pick-off member comprises telescoped rod-like structure wherein the pick-off member retracts when loaded so that additional articles are not removed from the conveyor.

---

This invention relates to an improved conveyor system as well as to improved parts for such a system or the like and improved methods of conveying products in such a system or the like.

It is well known that in many factories, plants, and the like desired products must be conveyed from various work stations to other work stations by automatic conveyor means whereby when the product is conveyed to a particular station the product can be removed from the conveyor means to be operated on at the particular station and, thereafter, be replaced on the conveyor means to be conveyed to another station or the like.

In particular, it is desirable to have a conveyor system so constructed and so arranged that the same will automatically remove the product from the conveyor means at the desired station so that the time-consuming removal feature can be automatically performed with a minimum of effort and with a minimum of apparatus.

According to the teachings of this invention, such an improved conveyor means is provided wherein the conveyed product is adapted to be automatically removed at a particular station along the conveying line in a unique and simple manner.

In particular, this inventon provides a conveyor system wherein a desired product is adapted to be attached to a conveying member that is detachably secured to a moving conveyor line. Pick-off means of this invention are so constructed and arranged and are disposed adjacent the conveyor line in such a manner that the same are adapted to automatically pick off the conveying member when the same advances to the pick-off member, the pick-off member releasing the conveying member from the conveyor line and causing the conveying member to be carried by the pick-off member.

In addition, this invention provides such a pick-off member which is adapted to automatically retract from its pick-off position when the particular pick-off member has been sufficiently loaded so that the same will not continue to pick off additional conveying means in the above manner.

Therefore, it is the object of this invention to provide an improved conveyor system having one or more of the novel features of this invention as set forth above or hereinafter shown or described.

Another object of this invention is to provide improved parts for such a conveyor system or the like.

A further object of this invention is to provide an improved method for conveying products or the like.

Other objects, uses and advantages of this invention are apparent from a reading of this description, which proceeds with reference to the accompanying drawings forming a part thereof and wherein:

FIGURE 1 is a schematic perspective view illustrating one embodiment of the conveyor system of this invention.

FIGURE 2 is a fragmentary perspective view illustrating the pick-off member of this invention in combination with the conveyor line of FIGURE 1.

FIGURE 3 is a front perspective view of the structure illustrated in FIGURE 2.

FIGURE 4 is a rear perspective view of the structure illustrated in FIGURE 2.

FIGURE 5 is an enlarged fragmentary view similar to FIGURE 3.

FIGURES 6, 7, 8, 9 and 10 are views similar to FIGURE 5 and respectively illustrate the various steps in the method of picking off a particular conveying member from the conveyor line of FIGURE 1 with the pick-off means of FIGURE 2.

FIGURE 11 is a fragmentary perspective view illustrating how the conveying member picked off by the pick-off member of this invention is adapted to pass beyond the supporting means of the pick-off member of this invention.

FIGURE 12 is a view similar to FIGURE 5 and illustrates another arrangement of this invention.

Figure 13:
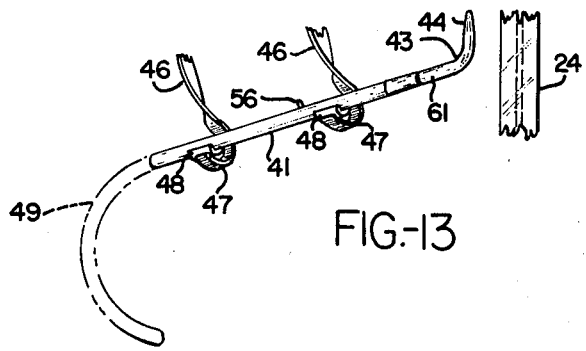
FIGURE 13 is a view similar to FIGURE 2 and illustrates another embodiment of this invention.

While the various features of this invention are hereinafter described and illustrated as being particularly adaptable for forming a conveyor system, it is to be understood that the various features of this invention can be utilized singly or in any combination thereof to provide other systems as desired.

Therefore, this invention is not to be limited to only the embodiments illustrated in the drawings, because the drawings are merely utilized to illustrate one of the wide variety of uses of this invention.

Referring now to FIGURE 1, an improved conveyor system of this invention is generally indicated by the reference numeral 20 and comprises a continuously moving conveyor line 21 suitably suspended from supporting structure 22 of a plant or the like whereby desired products can be conveyed in an overhead manner through a suitable plant or the like and be conveyed from station to station thereof, each station being generally indicated by the reference numeral 23.

As illustrated in FIGURES 1–4, the conveyor line 21 comprises a substantially I-shaped beam means 24 sinuously disposed throughout the plant to direct the conveyed products in the desired path throughout the plant, the I-beam structure 24 receiving a plurality of trolley-like members 25 supported on the I-beam structure 24 by a plurality of rollers 26 respectively disposed on opposite sides of the vertical flange or web 27 of the I-beam structure 24 and rolling on the bottom transverse web 28 thereof.

The trolley-like members 25 are adapted to be tied together by a cable-like member 29 whereby the trolley-like members 25 move in unison along the track 24 by suitable power means pulling or pushing the tying means 29 in one general direction.

Each trolley-like member 25 has a pair of opposed members 30 interconnected together by a spacer means of pin-like members 31 attached thereto, the rollers 26 being attached to each member 30 of each trolley-like member 25.

In this manner, a hook-like member 32 can be carried by each trolley-like member 25 by having an upper hook-shaped end 33 thereof disposed over the pin-like member 31 in the manner illustrated in FIGURE 4 whereby the lower hook-shaped portion 34 of the hook-like member 32 hangs vertically downwardly from the trolley-like member 25 for the purpose hereinafter described.

The conveying member of this invention is generally indicated by the reference numeral 35 throughout the figures of the drawings and comprises a first member 36 having a lower end 37 constructed in any desired manner to permit the same to be detachably secured to a desired product to be conveyed in the conveyor system 20, such attaching means not forming any part of this invention and can be formed in any desired manner. However, the other end 38 of the member 36 is provided with a hook shape to provide a pick-off means for the particular conveying member 35 in a manner hereinafter described.

Another member 39 is secured to the member 36 of each conveying member 35 and has a hook-shaped portion 40 to permit the particular conveying member 35 to be detachably secured to the trolley-like member 25 by having the hook-shaped end 40 thereof disposed over the hook-shaped end 34 of the hook member 32 of the respective trolley-like member 25 in the manner illustrated in FIGURE 4.

Thus, it can be seen that when the particular conveying member 35 has its end 37 interconnected to a desired product in any desired manner, the conveying member 35 can be attached to the conveyor line 21 by the hook portion 40 thereof in the manner illustrated in FIGURE 3 whereby the particular conveying member 35 will be conveyed along the track 24 by the trolley-like member 25 with the hook portion 38 thereof being disposed in the position illustrated in FIGURE 3 for a purpose now to be described.

As illustrated in FIGURES 2-4, a pick-off member 41 of this invention is provided and comprises a rod-like structure having a substantially straight portion 42 interconnected to a curved pick-off end 43 for a purpose hereinafter described, the pick-off end 43 being a substantially conical construction so that the same has a small tapering end portion 24 for a purpose hereinafter described.

The pick-off member 41 is adapted to be located adjacent the conveyor line 21 at a particular station 23 to automatically remove a conveying member 35 from the line 21 in a manner hereinafter described.

For example, each pick-off member 41 can be attached to a support member 45 angularly attached to the track 24 in the manner illustrated in FIGURE 3 by a pair of mounting brackets 46, each mounting bracket 46 having a looped end 47 passing around the pick-off member 41 and being secured to the lower surface thereof by a foot-like member 48 for a purpose hereinafter described.

With the pick-off member 41 disposed in the position illustrated in FIGURE 3, it can be seen that the curved end 43 thereof is disposed spaced from and parallel to the track 24 with the pick-off end 43 thereof being adapted to be aligned with the hook portion 38 of the conveying member 35 as the same is being conveyed along the track 24 in the above manner.

In particular, reference is now made to FIGURES 5-10 of the drawings wherein it can be seen in FIGURE 5 that as a particular conveying member 35 is being moved along the track 24 by the cable 29 in the manner previously described, the pick-off means 38 of the conveying member 35 is aligned with a pick-off end 43 of the pick-off member 41 at a particular station 23.

As illustrated in FIGURE 6, the pick-off end 43 of the pick-off member 41 is adapted to be received in the hook-shaped portion 38 of the moving conveying member 35. However, because the conveying member 35 moves downwardly at a rate faster than the decline of the pick-off member 41, the conveying member 35 is lifted off of the hook 34 of the trolley 25 in the manner illustrated in FIGURES 7 and 8 by the pick-off end 43 so that the conveying member 35 completely clears the hook 34 of the trolley 25 when the hook 38 of the conveying member 35 reaches the straight portion 42 of the pick-off member 41 in the manner illustrated in FIGURE 8.

Because the straight portion 42 of the pick-off member 41 is so disposed relative to the ground that the non-pick-off end thereof is disposed toward the ground, gravity causes the picked-off conveying member 35 to move downwardly along the straight portion 42 of the pick-off member 41 in the manner illustrated in FIGURE 10 for a purpose hereinafter described.

Because the mounting brackets 46 of the particular pick-off means 41 have the looped portions 47 thereof previously described, it can be seen that the hooked portion 38 of the picked-off conveying member 35 is adapted to pass beyond the same in the manner illustrated in FIGURE 11 as the picked-off conveying means 35 moves by gravity down the pick-off member 41.

If desired, the non-pick-off end of the pick-off member 41 could be shaped in the manner illustrated in phantom by the reference numeral 49 in FIGURE 13 so that the picked-off conveyor means member 35 will move down the pick-off member 41 and slip off the end 49 thereof into a suitable hopper or the like.

Alternately, the picked-off conveying means 35 could be manually moved from the pick-off member 41 if desired.

Further, the pick-off member 41 of this invention could be so constructed and arranged that the same automatically retains the picked-off conveying member 35 thereon and moves the pick-off end 43 thereof out of the path of the conveyor line 21 so that the particular pick-off member 41 will not pick off any additional conveying members 35 until the same is unloaded either manually or automatically as desired.

Figure 15:
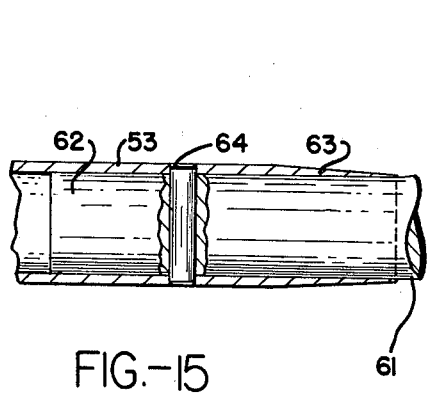
FIGURE 15 is an enlarged fragmentary cross-sectional view illustrating part of the pick-off member of FIGURE 14.
Figure 14:
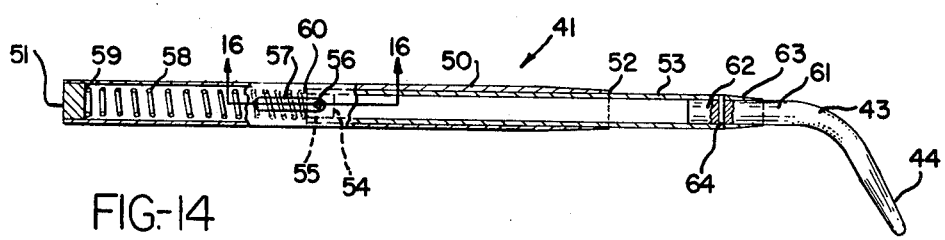
FIGURE 14 is a fragmentary cross-sectional view of the pick-off member of this invention.

In particular, reference is now made to FIGURES 14-15 wherein the pick-off member 41 of this invention comprises a first tubular member 50 having a closed end 51 and an open end 52 telescopically receiving another tubular member 53 moveable relative to the tubular member 50. The tubular member 53 carries a plug-like block 54 at the end 55 thereof with an actuating member 56 threadedly attached thereto and projecting outwardly through an elongated slot 57 formed in the tubular member 50 in the manner illustrated in FIGURES 14 and 16.

A compression spring 58 is disposed in the tubular member 50 and has one end 59 thereof disposed against the closed end 51 of the tubular member 50 and the other end 60 thereof bearing against the plug 54 of the tubular member 53.

In this manner, the force of the compression spring 58 normally maintains the tubular member 53 in the extended position illustrated in FIGURE 14 as the actuating member 56 is disposed against the right-hand end of the slot 57 whereby the particular pick-off member 41 is in an extended or pick-off position.

The curved pick-off end 43 of the pick-off member 41 comprises a substantially solid piece 61 having an end 62 disposed in the open end 63 of the tubular member 53 in the manner illustrated in FIGURE 14 and is pinned thereto by a pin 64 in the manner illustrated in FIGURE 15.

Figure 16:
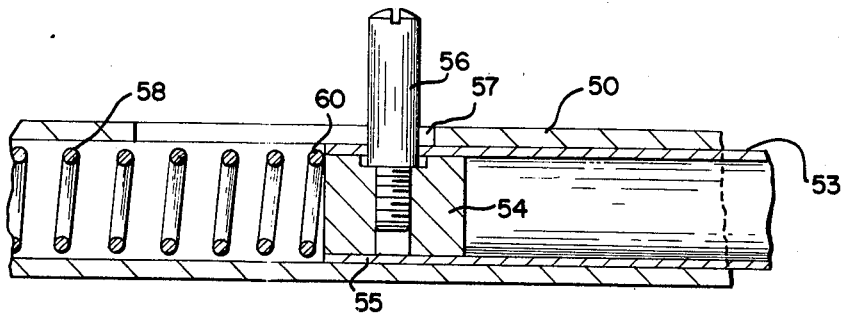
FIGURE 16 is an enlarged, fragmentary, cross-sectional view taken substantially on line 16—16 of FIGURE 14.

Therefore, it can be seen that when a particular routed conveying means 35 is picked off by the particular pick-off member 41 in the manner previously described, the hook portion 38 of the conveying member 35 moves down the pick-off member 41 by gravity until the same engages the actuating member 56 and moves the same from right to left in FIGURE 16 in opposition to the force of the compression spring 16. Since the tubular member 50 is held stationary by the mounting brackets 46 in the manner previously described, the tubular member 53 is adapted to be retracted into the tubular member 50 by movement of the actuating member 56 from the position illustrated in FIGURE 16 to the left until the same abuts the left-hand end of the slot 57 whereby the pick-off end 43 is retracted out of position from the conveyor line 21 so that the same will not pick off any additional conveying means 35 being moved along the conveyor line 21.

Thus, it can be seen that when the particular pick-off member 41 has been loaded by a picked-off conveyor member 35 in the manner previously described, the same automatically retracts its end 43 from adjacent the conveyor line 21 so that the particular pick-off member 41 will not pick off any additional conveying members 35.

While the pick-off member 41 of this invention has been described as having the end 43 thereof retracted after only one loaded conveying member 35 has been picked off by the same, it is to be understood that the compression spring 58 can be so constructed and arranged that the same will not permit retracting of the pick-off end 43 until one or more conveying means 35 have been picked off in the manner previously described.

Accordingly, it can be seen that when a loaded pick-off member 41 has the picked-off conveying means 35 removed therefrom, the spring 58 automatically extends the tubular member 53 back to its pick-off position to cause the same to pick off the conveying members 35 in the manner previously described.

The ends 52 and 63 of the tubular members 50 and 53 are so constructed and arranged that the same feather inwardly in a tapering manner to permit the hook-shaped portion 38 and the picked-off conveying member 35 to move down the same by gravity without any interference from the ends 63 and 52 thereof.

When it is desired to have a particular conveying member 35 not be picked off by a pick-off member 41 mounted on one side of the conveyor line 21 in the manner previously described, it can be seen that the conveying member 35 can be reversed from the position illustrated in FIGURE 5 to the position illustrated in FIGURE 12 so that a pick-off member 41 disposed to the left of the conveyor means 21 will not pick off the particular conveyor member 35 while a pick-off member 41 mounted to the right of the conveyor means 21 will pick off the conveyor member 35 illustrated in FIGURE 12 in the manner previously described.

While the conveying member 35 of this invention has been described as merely having two hook-shaped portions 38 and 40, it is to be understood that other hook portions can be formed thereon.

Figure 17:
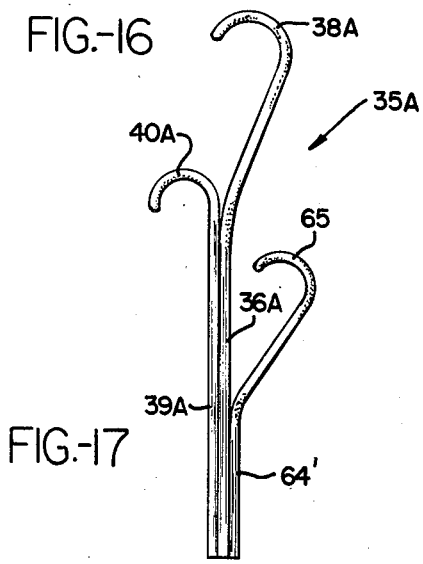
FIGURE 17 is a fragmentary view of another embodiment of the conveying member of this invention.

In particular, reference is made to FIGURE 17 of the drawings wherein another conveying member 35A of this invention is provided and parts thereof similar to the conveying member 35 previously described are indicated by like reference numerals or by the reference letter A.

As illustrated in FIGURE 17, another member 64 is attached to the member 36A and has a hook-shaped end portion 65 to either permit the conveying member 35A to be attached to a trolley-like member 25 in the manner previously described to cause the conveying means 35A not to be picked off by a pick-off member 41 in the manner previously described.

Therefore, it can be seen that the conveying members 35 and 35A of this invention can be modified as desired for any desired purpose.

In view the the above, it can be seen that this invention provides an improved conveyor system for conveying desired products from station to station wherein the desired product can be automatically removed at a desired station by the improved pick-off member of this invention.

Accordingly, not only does this invention provide an improved conveyor system which is relatively inexpensive to manufacture and operate, but also this invention provides improved parts for such a conveyor system and improved methods for conveying products or the like.

While the form of the invention now preferred has been disclosed as required by the statutes, other forms may be used, all coming within the scope of the claims which follow.

What is claimed is:

1. A conveyor system comprising a moving conveyor line, a conveying member detachably carried by said conveyor line and carrying a product, said conveying member having pick-off means, and a pick-off member disposed adjacent said conveyor line, said pick-off member having means to receive said pick-off means of said conveying member and cause said conveying member to be released from said conveyor line and be carried by said pick-off member, said pick-off member having means to permit moving said pick-off member in response to the effect of the weight of the conveying members and to prevent the same from picking-off additional conveying members once said pick-off member has been loaded.

2. A conveyor system as set forth in claim 1 wherein said pick-off member causes said picked-off conveying member to slide down the same by gravity.

3. A conveyor system as set forth in claim 1 wherein said pick-off member includes a rod-like structure.

4. A conveyor system as set forth in claim 1 wherein said last named means includes means to move the pick-off end of said pick-off member out of the path of the pick-off means of additional conveying members carried by said conveyor line.

5. A pick-off member for picking a conveying member from a conveyor line, said pick-off member having an end for receiving a hook of said conveying member wherein said pick-off member carries means actuated by weight of said conveying member for retracting said end.

References Cited

UNITED STATES PATENTS

| | | | |
|---|---|---|---|
| 570,023 | 10/1896 | Kennedy | 198—177 X |
| 788,543 | 5/1905 | Leue | 198—28 X |
| 2,868,354 | 1/1959 | Harrison | 198—177 |
| 2,947,407 | 8/1960 | Wood | 198—28 X |

EDWARD A. SROKA, Primary Examiner

U.S. Cl. X.R.

198—38, 177